(12) United States Patent
Mevissen et al.

(10) Patent No.: US 8,684,872 B2
(45) Date of Patent: Apr. 1, 2014

(54) WEAR COMPENSATED TENSIONER

(75) Inventors: Hubertus G. Mevissen, Schomberg (CA); James W. Dell, Newmarket (CA)

(73) Assignee: Litens Automotive Partnership, Woodbridge (CA)

( * ) Notice: Subject to any disclaimer, the term of this patent is extended or adjusted under 35 U.S.C. 154(b) by 1155 days.

(21) Appl. No.: 12/597,953

(22) PCT Filed: Apr. 30, 2008

(86) PCT No.: PCT/CA2008/000827
§ 371 (c)(1),
(2), (4) Date: Oct. 28, 2009

(87) PCT Pub. No.: WO2008/131559
PCT Pub. Date: Nov. 6, 2008

(65) Prior Publication Data
US 2010/0137084 A1    Jun. 3, 2010

Related U.S. Application Data

(60) Provisional application No. 60/915,218, filed on May 1, 2007.

(51) Int. Cl.
*F16H 7/12*    (2006.01)
(52) U.S. Cl.
USPC ........................................ 474/135
(58) Field of Classification Search
USPC .......... 184/101, 133, 135, 138; 474/101, 133, 474/135, 138
See application file for complete search history.

(56) References Cited

U.S. PATENT DOCUMENTS

| | | |
|---|---|---|
| 1,557,486 A | 10/1925 | Valentine |
| 1,670,914 A | 5/1928 | Tessky |
| 4,557,709 A | 12/1985 | St. John |
| 4,613,318 A | 9/1986 | McWilliam et al. |
| 4,698,049 A | 10/1987 | Bytzek et al. |
| 4,721,495 A | 1/1988 | Kan et al. |
| 4,822,322 A | 4/1989 | Martin |
| 4,826,471 A | 5/1989 | Ushio |
| 4,834,694 A | 5/1989 | Martin |
| 4,983,145 A | 1/1991 | Hirai et al. |
| 5,045,029 A | 9/1991 | Dec et al. |
| 5,045,031 A | 9/1991 | Thomey |

(Continued)

FOREIGN PATENT DOCUMENTS

| | | |
|---|---|---|
| CA | 1184828 | 4/1985 |
| CA | 1273510 | 9/1990 |

(Continued)

*Primary Examiner* — William E Dondero
*Assistant Examiner* — Robert T Reese
(74) *Attorney, Agent, or Firm* — Millman IP Inc.

(57) ABSTRACT

A tensioner for tensioning flexible drives employs an extruded shaft which can provide a relatively complex cross sectional shape to provide anti-rotation features to inhibit rotation of a pivot bushing located on the shaft. The pivot bushing has a frustoconical outer shape, as does the pivot surface of the hub of the tensioner arm which pivots on the pivot bushing. A dampening spring urges the pivot bushing towards the tensioner arm's pivot surface, providing for wear compensation and for dampening. The degree of dampening which is generated between the pivot bushing and the tensioner hub can be selected in a variety of manners: by varying the spring force; by changing the effective contact surface area between the pivot bushing and pivot surface; and/or by changing the coefficient of friction between the pivot bushing and the pivot surface.

25 Claims, 13 Drawing Sheets

(56) References Cited

U.S. PATENT DOCUMENTS

| | | |
|---|---|---|
| 5,083,983 A | 1/1992 | Hirai et al. |
| 5,277,666 A | 1/1994 | Kumm |
| 5,342,249 A | 8/1994 | Gardner et al. |
| 5,348,514 A | 9/1994 | Foley |
| 5,772,549 A | 6/1998 | Berndt et al. |
| 5,795,257 A | 8/1998 | Giese et al. |
| 5,967,919 A | 10/1999 | Bakker |
| 6,196,941 B1 | 3/2001 | Ohta et al. |
| 6,206,797 B1 | 3/2001 | Quintus |
| 6,416,435 B1 | 7/2002 | Szatkowski et al. |
| 6,422,962 B1 | 7/2002 | Lehtovaara et al. |
| 6,565,468 B2 | 5/2003 | Serkh |
| 6,575,860 B2 | 6/2003 | Dutil |
| 6,609,988 B1 | 8/2003 | Liu et al. |
| 6,682,452 B2 | 1/2004 | Quintus |
| 6,857,979 B2 | 2/2005 | MacNaughton et al. |
| 7,186,196 B2 | 3/2007 | Quintus |
| 8,002,657 B2 * | 8/2011 | Antchak et al. ............... 474/133 |
| 2002/0010044 A1 | 1/2002 | Ayukawa et al. |
| 2002/0010045 A1 | 1/2002 | Serkh |
| 2003/0216204 A1 | 11/2003 | Serkh et al. |
| 2004/0014542 A1 | 1/2004 | Quintus |
| 2005/0043130 A1 | 2/2005 | Hao et al. |
| 2005/0250609 A1 | 11/2005 | Ayukawa et al. |
| 2006/0100050 A1 * | 5/2006 | Crist et al. .................... 474/135 |
| 2006/0172837 A1 | 8/2006 | Quintus et al. |
| 2007/0249446 A1 | 10/2007 | Hao et al. |
| 2008/0194366 A1 * | 8/2008 | Mevissen et al. ............. 474/135 |
| 2008/0220919 A1 | 9/2008 | Antchak et al. |
| 2009/0005202 A1 * | 1/2009 | Crist et al. .................... 474/135 |

FOREIGN PATENT DOCUMENTS

| | | |
|---|---|---|
| CA | 2434653 | 9/2002 |
| CA | 2469497 | 6/2003 |
| CA | 2535108 | 3/2005 |
| DE | 4125494 C1 | 11/1992 |
| DE | 102004015770 A1 | 10/2005 |
| EP | 0361899 A1 | 4/1990 |
| EP | 0364277 A1 | 4/1990 |
| EP | 0425246 A1 | 5/1991 |
| EP | 0536809 A1 | 4/1993 |
| EP | 0709595 A | 5/1996 |
| EP | 0857890 A | 8/1998 |
| JP | 62031757 A | 2/1987 |
| WO | 2006099731 A1 | 9/2006 |

* cited by examiner

This application is a 371 of PCT/CA2008/000827 filed Apr. 30, 2008, which claims the benefit of U.S. Provisional No. 60/915,218 filed May 1, 2007.

WEAR COMPENSATED TENSIONER

CROSS-REFERENCE TO RELATED APPLICATIONS

This application is a 371 of PCT/CA2008/000827 filed Apr. 30, 2008, which claims the benefit of U.S. Provisional No. 60/915,218 filed May 1, 2007.

FIELD OF THE INVENTION

The present invention relates to a tensioner which operates to maintain a substantially constant tension in a flexible drive, such as a belt or chain. More specifically, the present invention relates to a tensioner which includes means to compensate for the wear of components of the tensioner which occurs during use and which can be efficiently manufactured.

BACKGROUND OF THE INVENTION

Tensioners for flexible drives, such as accessory serpentine belts on automotive engines are well known. Such tensioners typically include a pulley, roller or other member, which is biased against the flexible drive by a spring or other biasing means. The pulley is mounted, via a bearing, to a tensioner arm which pivots with respect to the tensioner housing. The housing contains the torsion spring, or other biasing means, which biases the arm towards the flexible drive to maintain a substantially constant tension in the flexible drive. Conventional tensioners can also include frictional members which ride on other members as the tensioner arm moves to provide a dampening force to dampen movement of the tensioner arm.

While such prior art tensioners are widely employed, they do suffer from some disadvantages. In particular, due to the relatively large forces which must be carried by the tensioner arm, wear at the pivot that attaches the arm to the tensioner housing is common and such wear can result in the pulley moving to an off-axis position wherein the surface of the pulley is not substantially perpendicular to the engagement surface of the flexible drive. Such off-axis positioning of the pulley results in increased amounts of wear at the pivot and eventually will result in the flexible drive being damaged and/or slipping off the tensioner pulley altogether.

While tensioners with wear compensating means are known, for example from WO 2006/099731 to the present inventors and assigned to the assignee of the present invention, such known tensioners can suffer from being expensive to manufacture and/or assemble.

It is desired to have a tensioner which provides a suitable dampening force, can provide compensation for normal wear of its components and which resists off-perpendicular movement of its components all at a reasonable cost of manufacture.

SUMMARY OF THE INVENTION

It is an object of the present invention to provide a novel tensioner for a flexible drive which obviates or mitigates at least one disadvantage of the prior art.

According to a first aspect of the present invention, there is provided a tensioner for tensioning a flexible drive, comprising: a base plate; a shaft, having a first end mounted to the base plate and including at least one anti-rotation feature; a pivot bushing slidably received on the shaft and engaging the at least one anti-rotation feature to prevent rotation of the pivot bushing on the shaft, the pivot bushing having an outer surface which is generally frustoconical in shape; a dampening spring biasing the pivot bushing along the shaft away from the base plate; a tensioner arm including a hub portion and a bearing mount surface distal the hub portion, the hub portion including a pivot surface having a frustoconical shape to engage the pivot bushing and to pivot thereon; a torsion spring having a first end engaging the base plate and a second end engaging the hub portion of the tensioner arm to bias the tensioner arm toward the flexible drive; a top plate mounted to the second end of the shaft; and a thrust washer located between the top plate and the tensioner arm to prevent off-axis movement of the tensioner arm while permitting pivoting of the tensioner arm.

Preferably, the shaft is formed by extruding and also preferably, the top plate and the base plate are mounted to the shaft by staking.

The present invention provides a tensioner for tensioning flexible drives such as drive belts or chains. The tensioner preferably employs an extruded shaft which can provide a relatively complex cross sectional shape to provide anti-rotation features to inhibit rotation of a pivot bushing located on the shaft. The pivot bushing has a frustoconical outer shape, as does the pivot surface of the hub of the tensioner arm which pivots on the pivot bushing. A dampening spring urges the pivot bushing towards the tensioner arm's pivot surface, providing for wear compensation and for dampening. The degree of dampening which is generated between the pivot bushing and the tensioner hub can be selected in a variety of manners, including: by varying the spring force of a dampening spring; by changing the effective contact surface area between the pivot bushing and pivot surface of the tensioner arm; and/or by changing the coefficient of friction between the pivot bushing and the pivot surface, such as by changing the material from which the pivot bushing is fabricated or by surface treating (i.e.—sandblasting, applying a coating, etc.) the pivot surface of the tensioner arm, etc.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
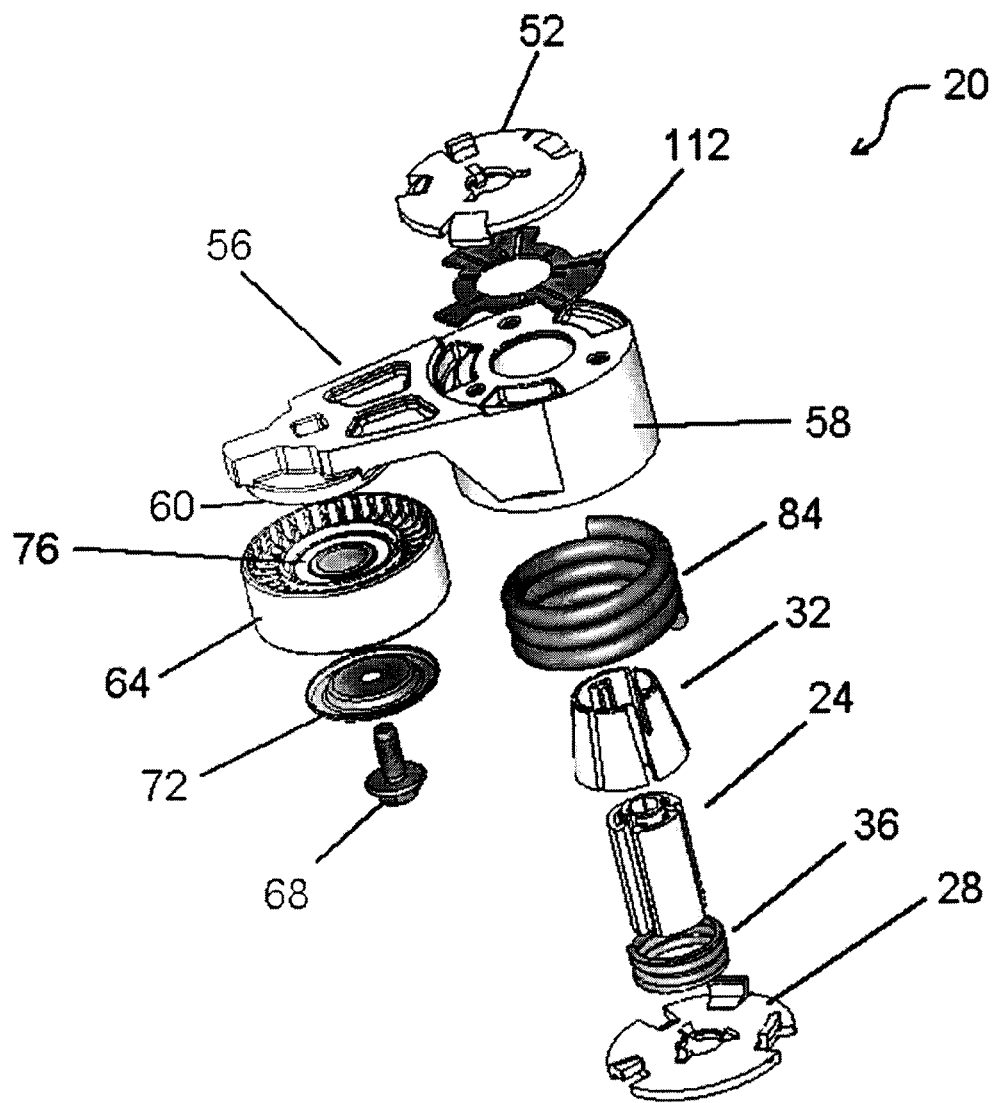
FIG. 1 shows a perspective exploded view of the top and side of a tensioner in accordance with the present invention.

A tensioner in accordance with the present invention is indicated generally at 20 in FIGS. 1, 2, 9 and 10. Tensioner 20 comprises a shaft 24 and a base plate 28, best seen in FIG. 3 and a pivot bushing 32. Pivot bushing 32 is slidably received on shaft 24 and is biased away from base plate 28 by a dampening spring 36, as further described below with reference to FIG. 4.

Shaft 24 can be fastened to base plate 28 via any suitable technique and, in the illustrated embodiment, shaft 24 is mounted to base plate 24 via staking.

Shaft 24 includes at least one anti-rotation feature to prevent rotation of pivot bushing 32 about shaft 24 while still permitting movement of pivot bushing 32 along shaft 24. In the illustrated embodiment, shaft 24 has been formed by extrusion includes three anti-rotation features, in the form of slots 40 along the length of shaft 24, and pivot bushing 32 includes complementary features 34 (best seen in FIG. 5) which engage slots 40 to prevent rotation of pivot bushing 32 about shaft 24.

Figure 3:
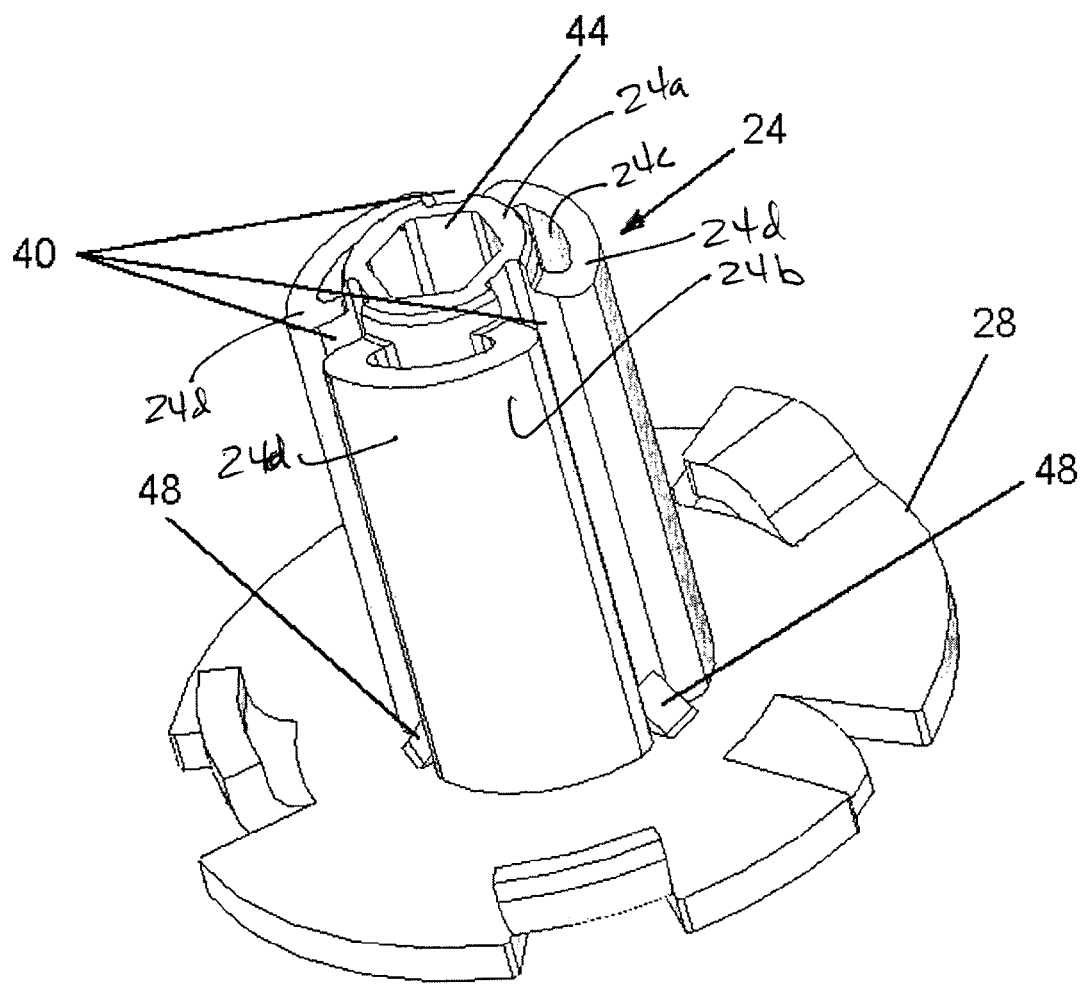
FIG. 3 shows a perspective view of the top and side of the assembly of a base plate and shaft for the tensioner of FIG. 1.

With specific reference to FIG. 3, the shaft 24 can be formed in a suitable manner (e.g., extrusion, casting, molding) so as to include a hollow central stem 24a, an outer stem surface 24b and a plurality of longitudinally extending apertures 24c that are disposed between the hollow central stem 24a and the outer stem surface 24b. The outer stem surface 24b can be defined by a plurality of lobes 24d that can be coupled to the hollow central stem 24a. Each of the anti-rotation features (e.g., the slots 40) can be disposed a pair of the lobes 24d.

As will be apparent to those of skill in the art, the present invention is not limited to the use of three longitudinally extending slots 40 to prevent rotation of pivot bushing 32 and it is contemplated that any suitable anti-rotation feature can be employed including the use of only one slot 40 extending from end to end of the shaft 24 or, more preferably, at least two generally longitudinally extending slots 40. Further, the anti-rotation feature on shaft 24 can be in the form of one or more ridges (not shown) in which case the complementary feature in pivot bushing 32 can be one or more corresponding slots.

As best seen in FIG. 3, in addition to slots 40, shaft 24 can include a center drive profile 44, which in the illustrated embodiment is a hexagonal passage, which can be engaged by a tool to prevent rotation of shaft 24 during assembly of tensioner 20 and/or during installation of tensioner 20. While center drive profile 44 in shaft 24 is preferred, it is not essential to the present invention and it is contemplated that it can be other suitable shapes or omitted from shaft 24 and tensioner 20 can be assembled and/or installed using known techniques.

As is also best seen in FIG. 3, base plate 28 includes a set of locating features 48 to assist in preventing shaft 24 from rotating with respect to base plate 28. In the illustrated embodiment, locating features 48 comprise a set of upstanding tabs which engage slots 40. As will be apparent to those of skill in the art, if shaft 24 is fastened to base plate 28 via a method which would inherently prevent rotation of shaft 24 with respect to base plate 28 (such as via welding) then locating features 48 can be omitted.

Base plate 28 can be fabricated in a variety of manners, as will occur to those of skill in the art, but in the illustrated embodiment of the invention base plate 28 has been formed by stamping which has been found to be a cost effective manner of forming base plate 28. As is further discussed below, top plate 52 is also preferably manufactured by stamping and, in the embodiment illustrated in FIGS. 1 through 11, top plate 52 is another instance of base plate 28, thus requiring only a single set of stamping tooling to manufacture plates which can serve as both base plate 28 and top plate 52.

In a present embodiment, it is preferred that shaft 24 be formed by extrusion to easily obtain the anti-rotation features, to reduce costs and to provide center drive profile 44, if desired. However, the present invention is not limited to use with tensioners where shaft 24 is formed by extrusion and shafts 24 manufactured by other methods, including machining and/or casting can be employed if desired.

Figure 4:
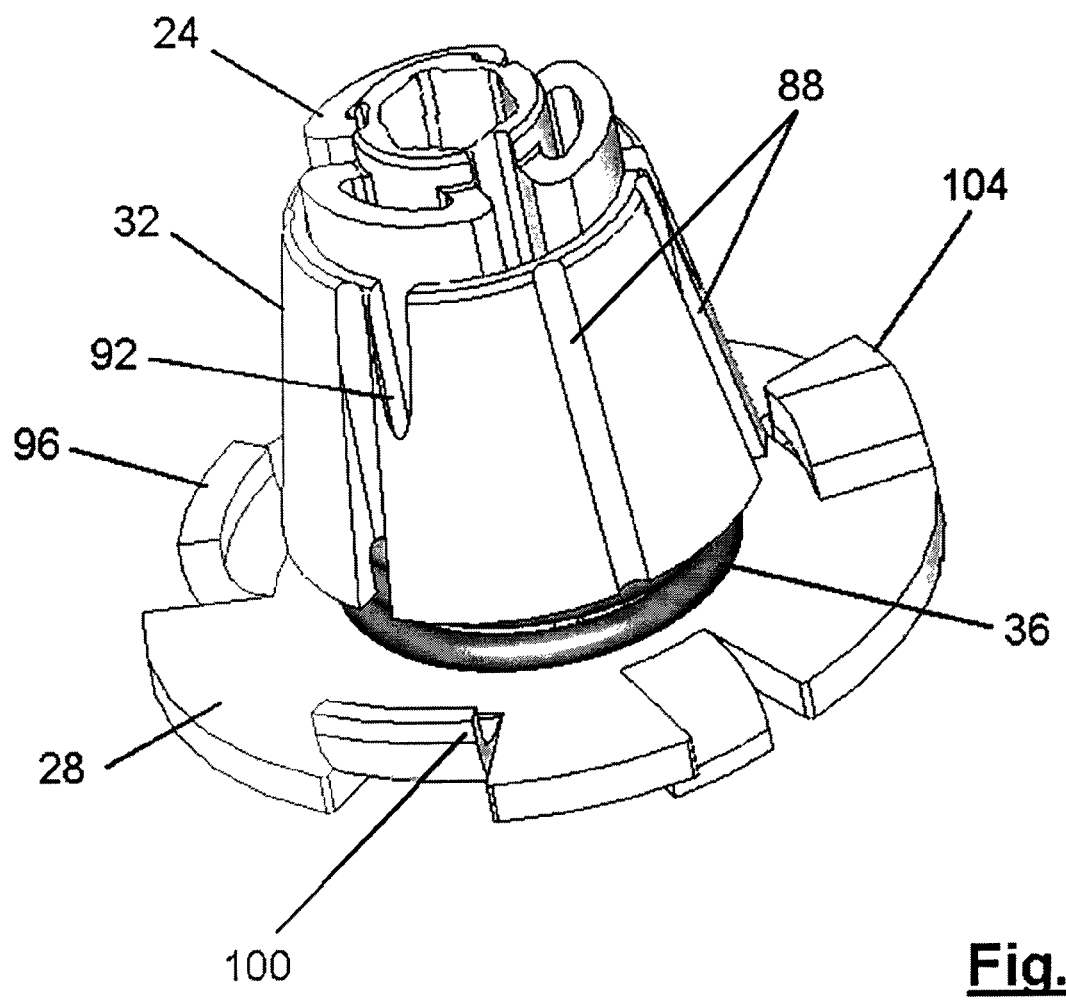
FIG. 4 shows the assembly of FIG. 3 with a dampening spring and pivot bushing in place on the assembly.
Figure 5:
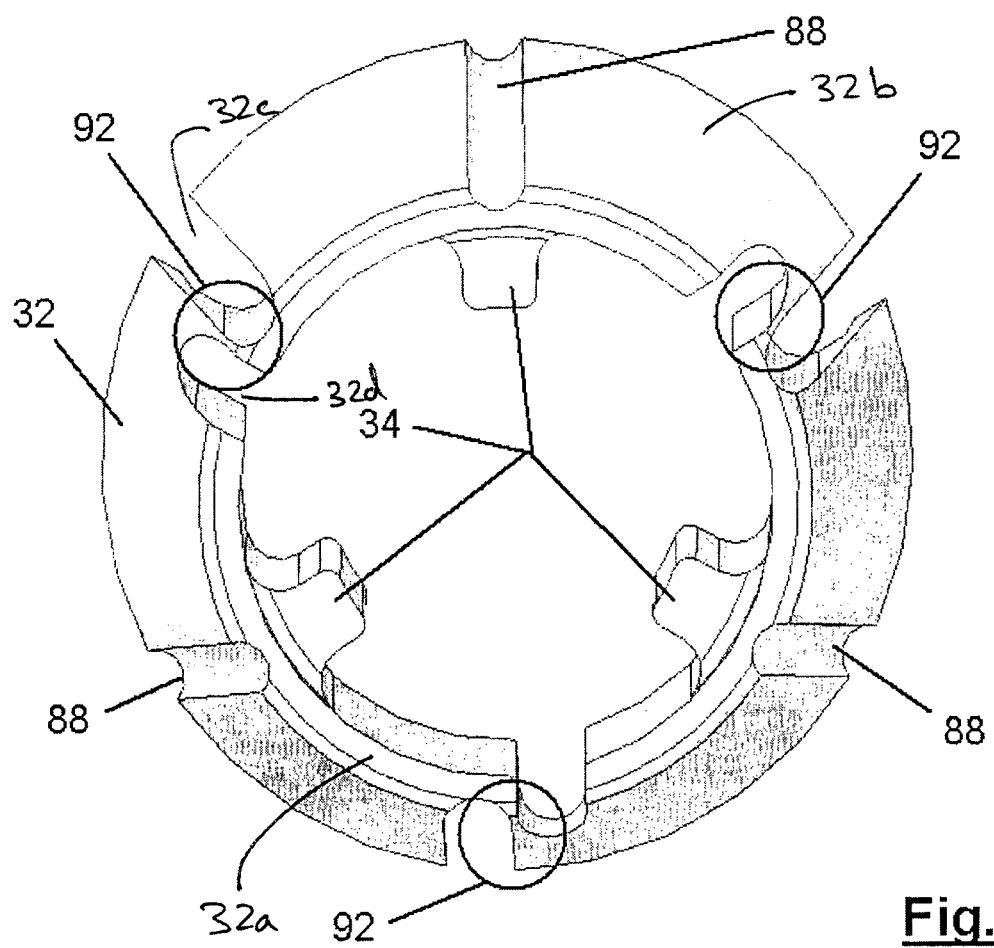
FIG. 5 shows a top view of the pivot bushing of FIG. 4.

As shown in FIGS. 4 and 5, and as mentioned above, pivot bushing 32 is slidably received on shaft 24 and is biased away from base plate 28 by a dampening spring 36. The inner surface of pivot bushing 32 is complementary to the outer surface of shaft 24 to allow pivot bushing 32 to slide along shaft 24 and, if shaft 24 is equipped with anti-rotation features, such as slots 40, then the inner radial surface of pivot bushing 32 includes at least one complementary feature, such as upraised ribs 34, which engages the anti-rotation feature of shaft 24 to prevent rotation of pivot bushing 32 about shaft 24 while allowing pivot bushing 32 to slide along the length of shaft 24.

While in the illustrated embodiment dampening spring 36 is shown as a coil spring, it will be understood by those of skill in the art that dampening spring 36 can be any suitable mechanism for biasing pivot bushing 32 away from base plate 28.

The outer surface and/or shape of shaft 24 can be a variety of other shapes, as will occur to those of skill in the art, and the inner surface of pivot bushing 32 will be a complementary shape which allows pivot bushing 32 to slide along shaft 24. For example, shaft 24 can be hexagonal, square or triangular in section and the inner surface of pivot bushing 32 will be an appropriate shape which permits pivot bushing 32 to slide along shaft 24 and which, if desired, can prevent rotation of pivot bushing 32 on shaft 24.

Figure 2:
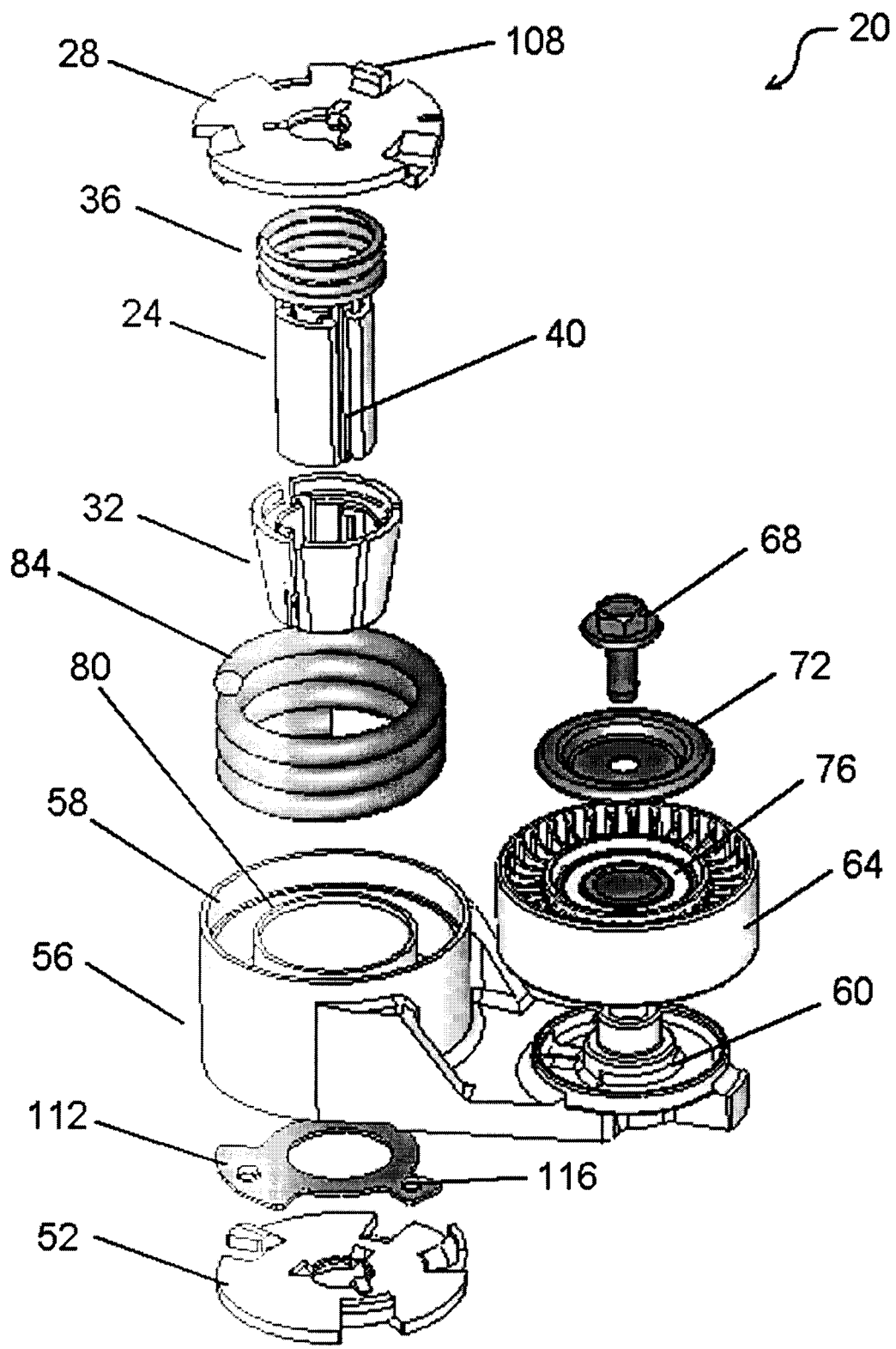
FIG. 2 shows a perspective exploded view of the bottom and side of the tensioner of FIG. 1.
Figure 6:
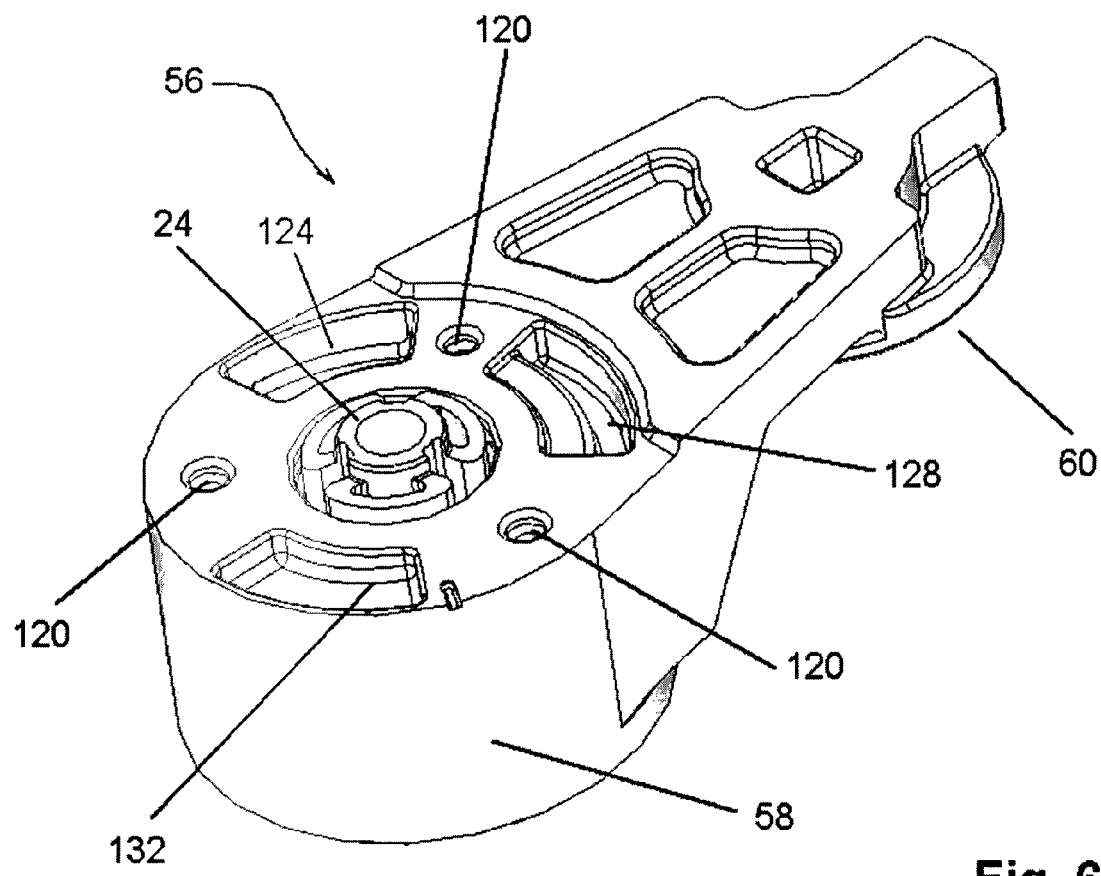
FIG. 6 shows perspective view of the top and side of a tensioner arm in the assembly of FIGS. 9 and 10.
Figure 7:
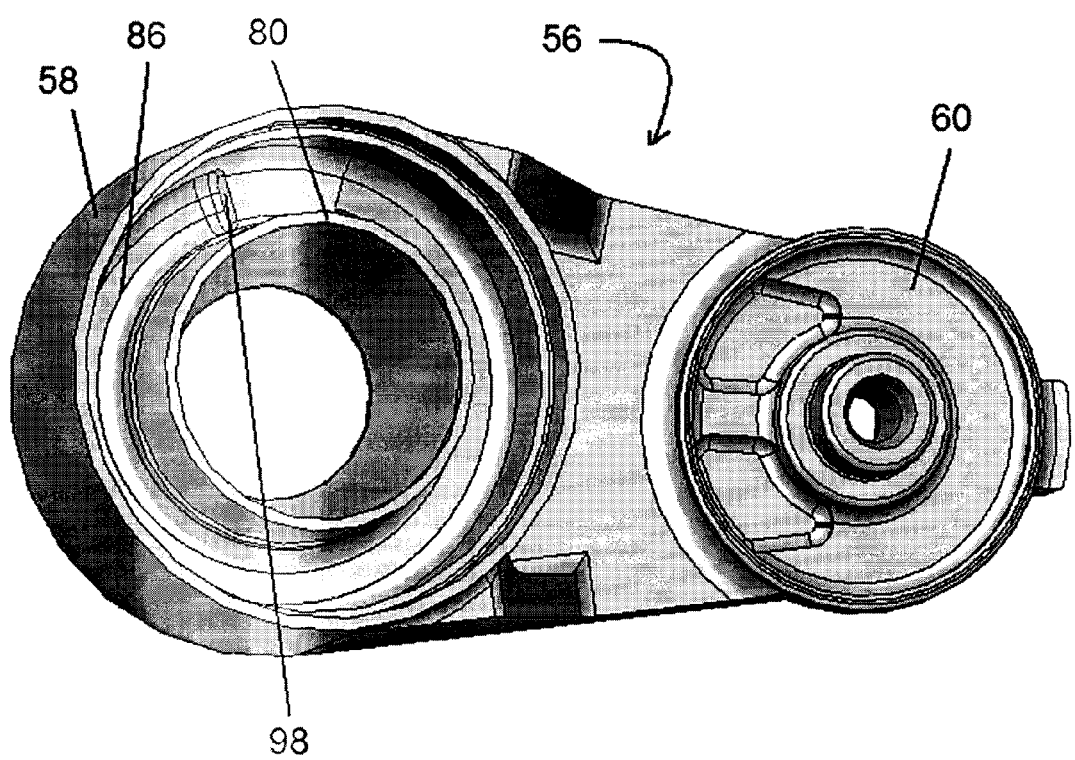
FIG. 7 shows a perspective view of the bottom and side of the tensioner arm of FIG. 6.

Tensioner 20 further includes a tensioner arm 56, best seen in FIGS. 2, 6 and 7 (in FIG. 6, the illustrated embodiment of shaft 24 does not include the optional drive profile 44). Tensioner arm 56 includes a hub 58 and a bearing mount surface 60, spaced from hub 58. A pulley 64 is mounted to bearing mount surface 60 via any suitable manner, such as a bolt 68 and, if desired, can include a dust shield 72. Pulley 64 includes a bearing 76, which permits pulley 64 to rotate with respect to tensioner arm 56, and bearing 76 can be integrally formed with pulley 64 or bearing 76 can be separate from pulley 64 and suitably mounted therein. The outer surface of pulley 64 is preferably complementary to the surface of the flexible drive which tensioner 20 is intended to tension.

Hub 58 of tensioner arm 56 includes an annular pivot surface 80 which has a generally cylindrical outer surface and a generally frustoconical inner surface. One end of a tensioner torsion spring 84 is received in a helical raceway 86 between pivot surface 80 and the inner surface of hub 58, as described below in more detail.

The outer surface of pivot bushing 32 is also a frustoconical shape and preferably is a complementary shape to the frustoconical shape of the inner surface of pivot surface 80. When tensioner 20 is assembled, the inner surface of pivot surface 80 engages and rides on the outer surface of pivot bushing 32. Dampening spring 36 results both in pivot bushing 32 being moved up along shaft 24 over time to compensate for wear of the outer surface of pivot bushing 32 and for dimensional variations due to manufacturing tolerances and also provides the normal force for the frictional engagement between pivot bushing 32 and the inner surface of pivot surface 80.

In a present embodiment of tensioner 20, pivot bushing 32 is manufactured from an engineered Nylon 4/6 (such as Stanyl TW363) and can be formed by injection molding or any other suitable manufacturing process. Tensioner arm 56 is manufactured from cast aluminum or other suitable material and the inner surface of pivot surface 80 is that produced as a result of the casting process, although this surface can be further machined or polished if desired.

It is contemplated that, if desired, the coefficient of friction produced between pivot bushing 32 and the inner surface of pivot surface 80 can be altered by applying a surface treatment to the inner surface and/or to pivot bushing 32 by, for example, sand blasting, polishing or applying a desired coating to the inner surface or to pivot bushing 32 to achieve the desired coefficient of friction. It is also contemplated that the material from which pivot bushing 32 is manufactured can be varied to alter the coefficient of friction, in conjunction with the above-mentioned surface treatment of the inner surface or as an alternative thereto.

In addition to, or instead of, changing the coefficient of friction, the dampening produced by tensioner 20 can also be varied by changing the force exerted by dampening spring 36 on pivot bushing 32 and/or by changing the effective contact surface area between pivot bushing 32 and the inner surface of pivot surface 80.

Returning now to FIGS. 4 and 5, it is preferred that pivot bushing 32 include one or more features, such as grooves 88, which assist in the removal of debris, dirt and/or water from between the contact surfaces of pivot bushing 32 and the inner surface pivot surface 80 of tensioner 20.

It is also preferred that pivot bushing 32 include at least one deformable portion 92 which allows pivot bushing 32 to be slightly deformed radially, if necessary, to accommodate manufacturing tolerances and/or thermal expansion and/or contraction of shaft 24 and/or pivot bushing 32 while still inhibiting off-axis deformation of pivot bushing 32 which could occur if pivot bushing 32 was a conventional split bushing design and which could lead to off axis movement of tensioner arm 56. Stated another way, pivot bushing 32 includes a unitarily formed, annular and unbroken wall 32a with at least one deformable portion 92. Each deformable portion 92 can be formed by a narrowing of wall 32a and can be configured to permit the frustoconical outer surface 32b of pivot bushing 32 to expand radially outwardly and/or contract radially inwardly. In the particular example provided the narrowing of wall 32a is formed by a pair of slots 32c, 32d. Slots 32c, 32d can be disposed in various different orientations, but such as parallel to one another and optionally parallel to a longitudinal axis of shaft 24.

As will be apparent to those of skill in the art, deformable region 92 is not limited to the illustrated structure and any other structure which results in a deformable region allowing for circumferential deformation of pivot bushing 32 can be employed.

Figure 8:
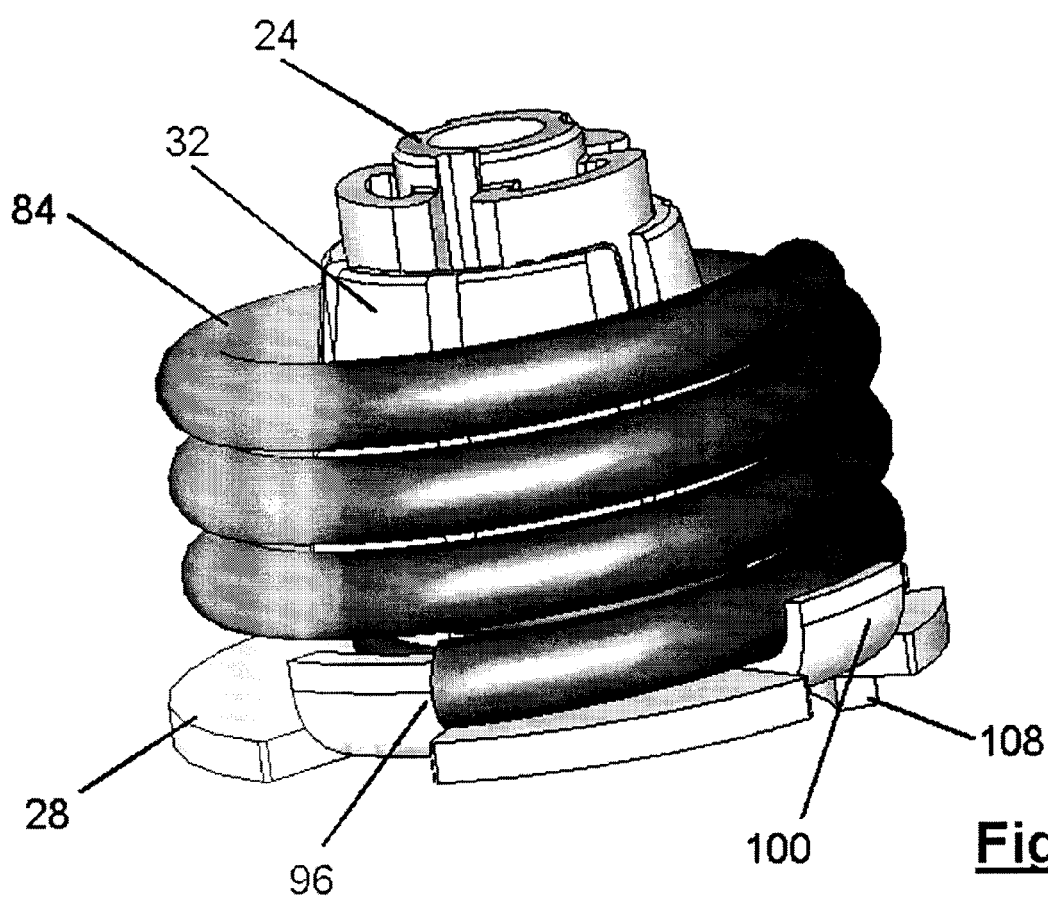
FIG. 8 shows the assembly of FIG. 4 with a torsion spring in place on the assembly.

FIG. 8 shows torsion spring 84 in place over the assembly of FIG. 4 (in FIG. 8, the illustrated embodiment of shaft 24 does not include the optional drive profile 44). As can be seen, base plate 28 includes a spring stop 96, against which one end of torsion spring 84 abuts and helical raceway 86 of tensioner arm 56 includes a spring stop 98 (best seen in FIG. 7) against which the other end of torsion spring 84 abuts. By providing spring stops 96 and 98, the additional manufacturing steps required to form tangs on torsion spring 84 are avoided, thus reducing manufacturing costs.

Base plate 28 further includes two spring supports 100 and 104 (best seen in FIG. 4) on which torsion spring 84 rests and helical raceway 86 receives the top of torsion spring 84. Spring supports 100 and 104 and helical raceway 86 operate to level torsion spring 84 such that its longitudinal axis is substantially aligned with the longitudinal axis of shaft 24 and thus the additional manufacturing steps required to flatten the ends of torsion spring 84 to otherwise achieve such an alignment are avoided, thus reducing manufacturing costs. Additionally, spring support 100, and the sidewall of helical raceway 86, abut the outside diameter of the, respective, first coil of torsion spring 84 to inhibit torsion spring 84 from moving laterally instead of being twisted by the torque forces exerted on it.

However, it is also contemplated that each end of torsion spring 84 can be ground flat, if desired, eliminating the need for helical raceway 86 and spring supports 100 and 104 and allowing the overall height of tensioner 20 to be reduced, albeit at a somewhat increased cost of manufacture resulting from the necessary grinding operations on torsion spring 84.

Base plate 28 preferably further includes an indexing feature 108 which can engage a complementary feature located on the surface to which tensioner 20 will be mounted to locate tensioner 20 in a desired orientation.

While in the Figures torsion spring 84 is shown as having a circular cross section, the present invention is not so limited and torsion spring 84 can be manufactured with square, rectangular or other cross sections if desired.

Figure 9:
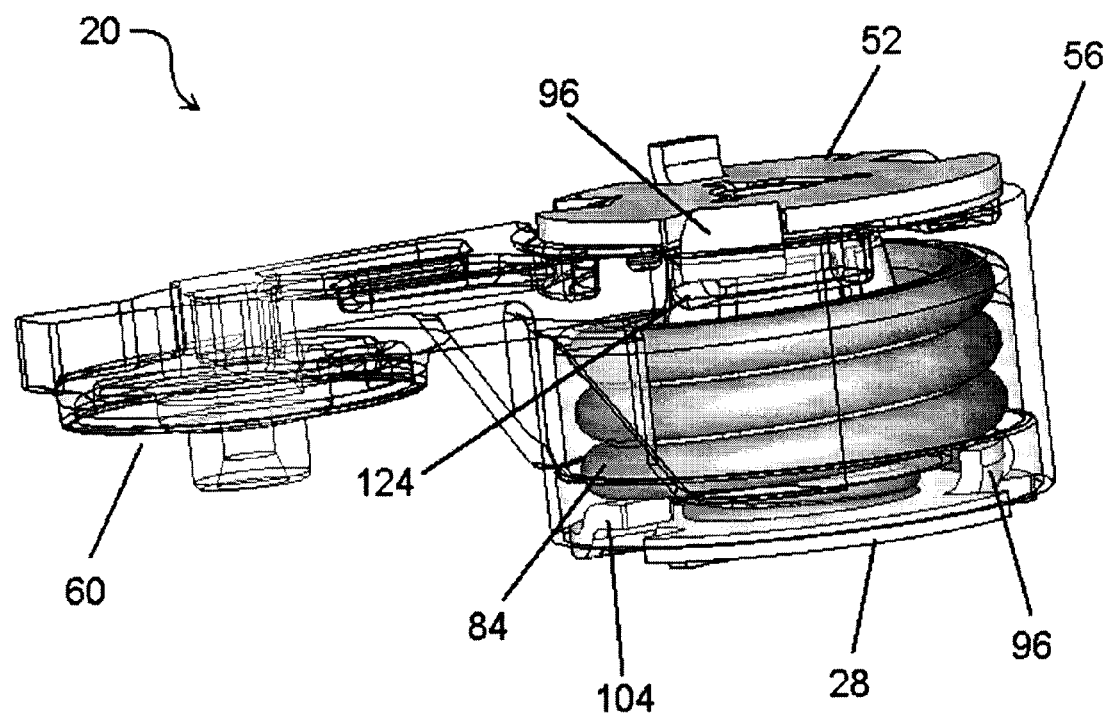
FIG. 9 shows a perspective view of the top and side of the assembled tensioner of FIG. 1 wherein the tensioner arm is transparent.
Figure 10:
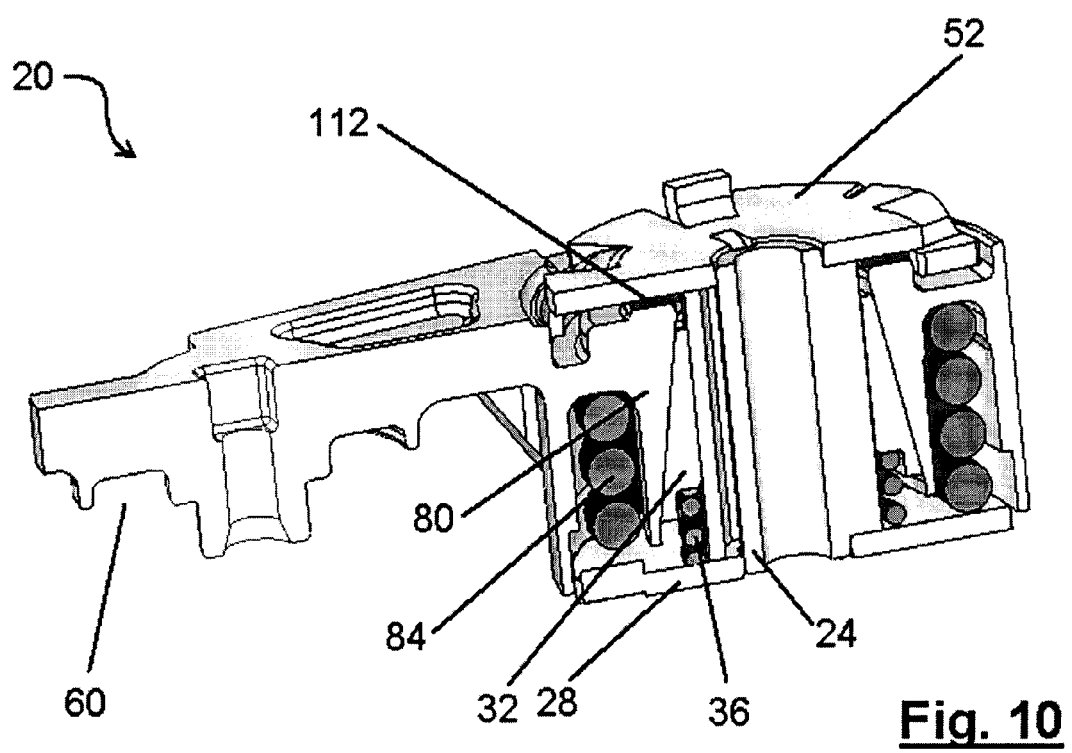
FIG. 10 shows a cross section view through the assembled arm and hub of the tensioner of FIGS. 1 and 9.
Figure 11:
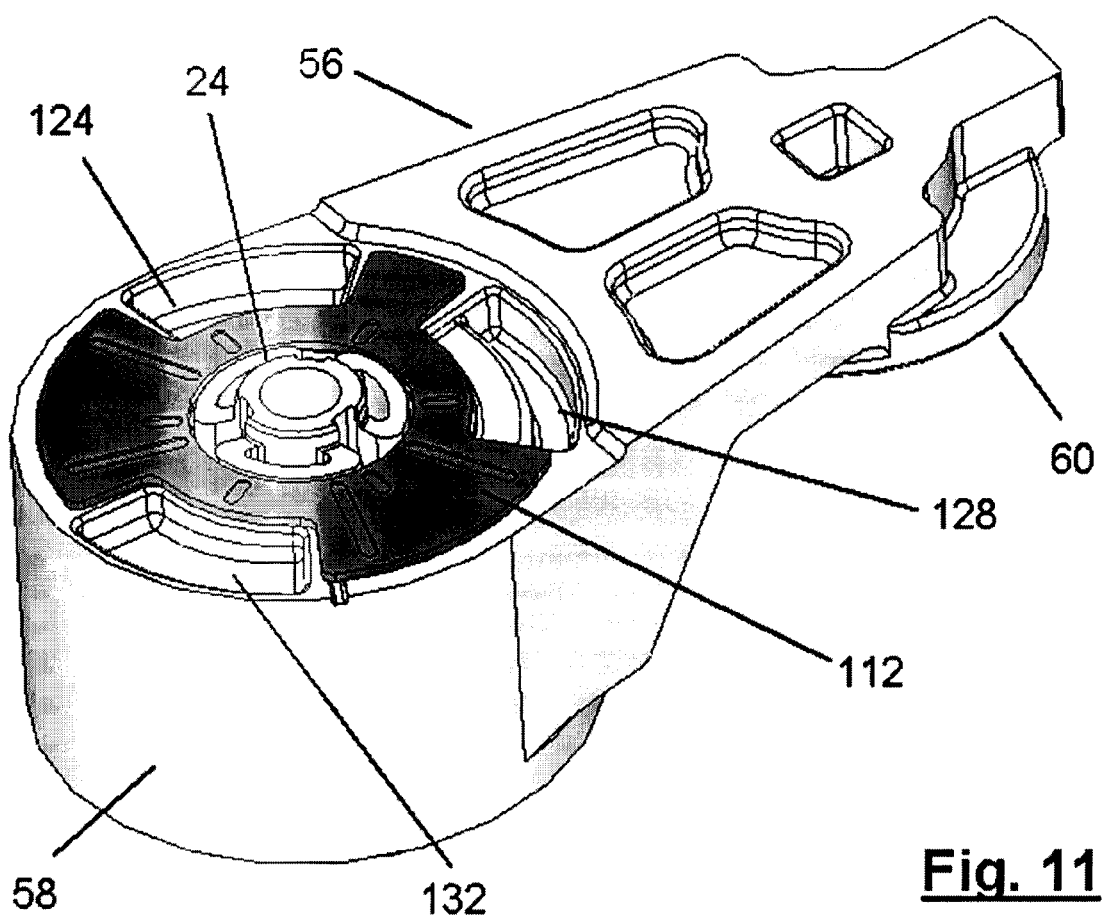
FIG. 11 shows a thrust washer located atop the tensioner arm when the tensioner of FIG. 10 is being assembled.

In FIGS. 9 and 10, tensioner arm 56 has been installed over the assembly of FIG. 6 and a thrust washer 112 and top plate 52 have been installed. When assembling tensioner 20, thrust washer 112 includes at least one index feature 116 (and in the illustrated embodiment thrust washer 112 includes three index features 116, as best seen in FIG. 2) which engages complementary features 120 (best seen in FIG. 6) in tensioner arm 56 to align thrust washer 112 as shown in FIG. 11. Thrust washer 112 acts between top plate 52 and tensioner arm 56 to inhibit off-axis movement of tensioner arm 56 due to loading on pulley 64 by a flexible drive.

As mentioned above, in the illustrated embodiment top plate 52 is another instance of base plate 28. When top plate 52 is assembled atop thrust washer 112, each of spring stop 96 and spring supports 100 and 104 are received, respectively, in slots 124, 128 and 132 in tensioner arm 56. Index feature 116 of thrust washer 112 engages a respective one of features 120 in tensioner arm 56 to ensure that thrust washer 112 does not cover or obscure any of slots 124, 128 or 132.

Top plate 52 is then fastened to shaft 24 via any appropriate means and, in the illustrated embodiment, this is achieved by staking shaft 24 to top plate 52.

As top plate 52 remains stationary, along with base plate 28 and shaft 24, as tensioner arm 56 rotates, the ends of slot 124 abut spring stop 96 to define the intended limits of rotation for tensioner arm 56.

To complete the assembly of tensioner 20, pulley 64 is attached to bearing surface 60 by bolt 68 and, if desired, dust shield 72. Tensioner 20 can then be installed on an engine or other device with a mounting bolt which passes through the center of shaft 24 and into the engine or device. If present, index feature 108 of base plate 28 is positioned in a complementary index feature on the engine or other device to ensure tensioner 20 is installed in a desired orientation thereon.

As mentioned above, in the embodiment of tensioner 20 discussed above, top plate 52 is another instance of base plate 28. While this re-use of base plate 28 can provide a savings in tooling and/or manufacturing costs, it is contemplated that top plate 52 can be a distinct part, if desired. In such a case, top plate 52 can be designed to omit the feature which limits rotation of tensioner arm 56.

Figure 12:
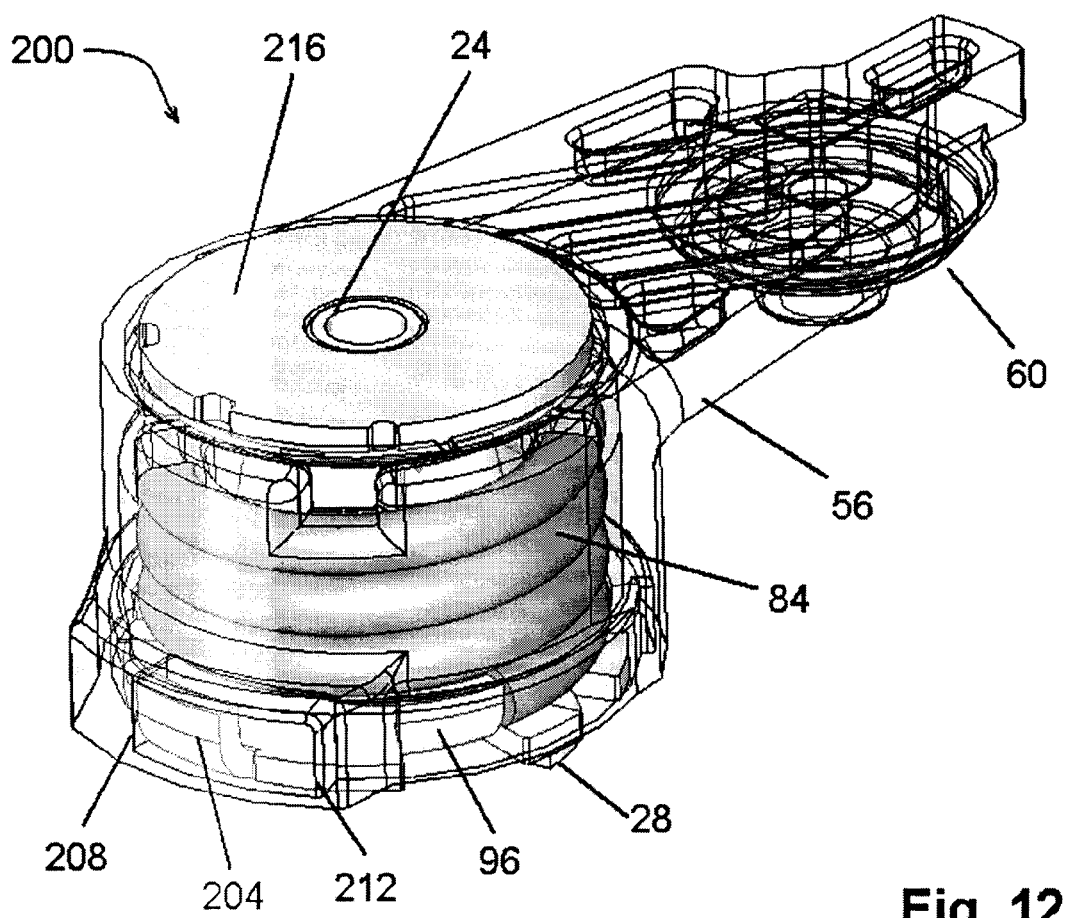
FIG. 12 shows a perspective view of the top and side of another tensioner in accordance with the present invention, wherein the tensioner arm is transparent.
Figure 13:
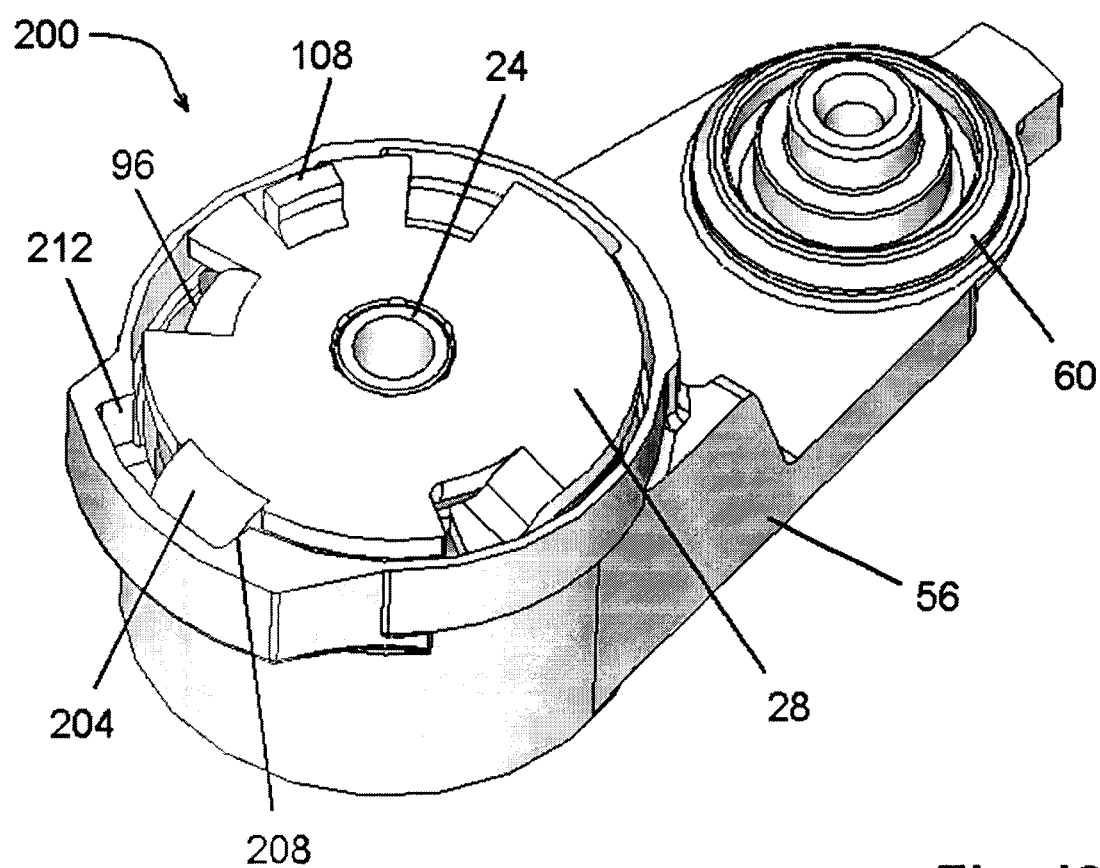
FIG. 13 shows a perspective view of the bottom and side of the tensioner of FIG. 12.

Another embodiment of a tensioner in accordance with the present invention is indicated generally at 200 in FIGS. 12 and 13, wherein like components to those of tensioner 20 are indicated with like reference numerals.

With tensioner 200, base plate 28 further includes a limit stop tab 204 which extends between a pair of limit stops 208 and 212 on tensioner arm 56 to limit the range of rotation of tensioner arm 56 with respect to base plate 28. With tensioner 200, top plate 216 is a simple annular plate which is fixed to shaft 24, preferably by staking, as top plate 216 does not function to limit rotation of tensioner arm 56. Similarly, the thrust washer (not seen in the Figures) can be a simple annular disc which can be free to rotate with tensioner arm 56. Unlike with tensioner 20, in tensioner 200 there is no torque applied to top plate 216, as it does not limit rotation of tensioner arm 56, and thus the torque exerted on shaft 24 and/or one the connections between shaft 24 and base plate 28 and top plate 216 is reduced.

The present invention provides a tensioner for tensioning flexible drives such as rubber drive belts or chains. The tensioner preferably employs an extruded shaft which can provide a relatively complex cross sectional shape to provide anti-rotation features to inhibit rotation of a pivot bushing located on the shaft. The pivot bushing has a frustoconical outer shape, as does the pivot surface of the hub of the tensioner arm which pivots on the pivot bushing. A dampening spring urges the pivot bushing towards the tensioner arm's pivot surface, providing for wear compensation and for dampening. The degree of dampening which is generated between the pivot bushing and the tensioner hub can be selected in a variety of manners, including: by varying the spring force of the dampening spring; by changing the effective contact surface area between the pivot bushing and pivot surface of the tensioner arm; and/or by changing the coefficient of friction between the pivot bushing and the pivot surface by changing the material from which the pivot bushing is fabricated or by surface treating (i.e.—sandblasting, applying a coating, etc.) the pivot surface of the tensioner arm, etc.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A tensioner for tensioning a flexible drive, the tensioner comprising:
    a base plate;
    a shaft having a first end mounted to the base plate and including at least one anti-rotation feature;
    a pivot bushing slidably received on the shaft and engaging the at least one anti-rotation feature to prevent rotation of the pivot bushing on the shaft, the pivot bushing having an outer surface which is generally frustoconical;
    a damping spring biasing the pivot bushing along the shaft away from the base plate;
    a tensioner arm including a first portion and a second portion opposite the first portion, the first portion including a pivot surface having a frustoconical shape complimentary to and engaging the pivot bushing to pivot thereon;
    a torsion spring having a first end engaging the base plate and a second end biasing the tensioner arm to bias the tensioner arm in a predetermined direction relative to the base plate; and
    a pulley coupled to the second portion of the tensioner arm;
    wherein the pivot bushing includes a unitarily formed, annular and unbroken wall with at least one deformable portion, each deformable portion being formed by a narrowing of the wall, the at least one deformable portion being configured to permit the frustoconical outer surface of the pivot bushing to expand radially outward, contract radially inward or both.

2. The tensioner of claim 1, wherein the narrowing of the wall is formed by first and second slots that are positioned adjacent one another on opposite sides of the wall.

3. The tensioner of claim 2, wherein the slots are parallel to one another.

4. The tensioner of claim 3, wherein the slots are parallel to a longitudinal axis of the shaft.

5. The tensioner of claim 1, wherein the wall defines a plurality of grooves that intersect the frustoconical outer surface.

6. The tensioner of claim 1, further comprising a top plate and a thrust washer, the top plate being coupled to a second end of the shaft opposite the base plate, the thrust washer being located between the top plate and the tensioner arm, the thrust washer being configured to inhibit off-axis movement of the tensioner arm while permitting pivoting of the tensioner arm about a longitudinal axis of the shaft.

7. The tensioner of claim 6, wherein the top plate and the base plate are interchangeable.

8. The tensioner of claim 6, wherein one of the top plate and the base plate interact with the tensioner arm to limit a range through which the tensioner arm can pivot with respect to the pivot bushing.

9. The tensioner of claim 1, wherein the shaft includes a hollow central stem, an outer stem surface and a plurality of longitudinally extending apertures disposed between the hollow central stem and the outer stem surface.

10. The tensioner of claim 9, wherein the outer stem surface is defined by a plurality of lobes that are coupled to the hollow central stem.

11. The tensioner of claim 10, wherein each of the at least one anti-rotation features is disposed between a pair of the lobes.

12. The tensioner of claim 11, wherein each of the at least one anti-rotation features is a longitudinally extending slot.

13. A tensioner for tensioning a flexible drive, the tensioner comprising:
    a base plate;
    a shaft having a first end mounted to the base plate and including at least one anti-rotation feature;
    a pivot bushing slidably received on the shaft and engaging the at least one anti-rotation feature to prevent rotation of the pivot bushing on the shaft, the pivot bushing having an outer surface which is generally frustoconical;
    a damping spring biasing the pivot bushing along the shaft away from the base plate;
    a tensioner arm including a first portion and a second portion opposite the first portion, the first portion including a pivot surface having a frustoconical shape complimentary to and engaging the pivot bushing to pivot thereon;
    a torsion spring having a first end engaging the base plate and a second end biasing the tensioner arm to bias the tensioner arm in a predetermined direction relative to the base plate; and a pulley coupled to the second portion of the tensioner arm; wherein the shaft includes a hollow central stem, an outer stem surface and a plurality of longitudinally extending apertures disposed between the hollow central stem and the outer stem surface.

14. The tensioner of claim 13, wherein the outer stem surface is defined by a plurality of lobes that are coupled to the hollow central stem.

15. The tensioner of claim 14, wherein each of the at least one anti-rotation features is disposed between a pair of the lobes.

16. The tensioner of claim 15, wherein each of the at least one anti-rotation features is a longitudinally extending slot.

17. The tensioner of claim 13, further comprising a top plate and a thrust washer, the top plate being coupled to a second end of the shaft opposite the base plate, the thrust washer being located between the top plate and the tensioner arm, the thrust washer being configured to inhibit off-axis movement of the tensioner arm while permitting pivoting of the tensioner arm about a longitudinal axis of the shaft.

18. The tensioner of claim 17, wherein the top plate and the base plate are interchangeable.

19. The tensioner of claim 18, wherein the top plate interacts with the tensioner arm to limit a range through which the tensioner arm can pivot with respect to the pivot bushing.

20. A tensioner for tensioning a flexible drive, comprising:
a base plate;
a shaft, having a first end mounted to the base plate and including at least one anti-rotation feature;
a pivot bushing slidably received on the shaft and engaging the at least one anti-rotation feature to prevent rotation of the pivot bushing on the shaft, the pivot bushing having an outer surface which is generally frustoconical in shape;
a dampening spring biasing the pivot bushing along the shaft away from the base plate;
a tensioner arm including a hub portion and a bearing mount surface distal the hub portion, the hub portion including a pivot surface having a frustoconical shape complementary to and engaging the pivot bushing to pivot thereon;
a torsion spring having a first end engaging the base plate and a second end engaging the hub portion of the tensioner arm to bias the tensioner arm toward the flexible drive;
a top plate mounted to the second end of the shaft; and
a thrust washer located between the top plate and the tensioner arm to prevent off-axis movement of the tensioner arm while permitting pivoting of the tensioner arm.

21. The tensioner of claim 20 wherein the top plate and the base plate are interchangeable parts.

22. The tensioner of claim 20 wherein the dampening force of the tensioner can be varied by changing the dampening spring to change the force with which the pivot bushing is biased away from the base plate.

23. The tensioner of claim 20 wherein the top plate interacts with the tensioner arm to limit the range through which the tensioner arm can pivot with respect to the pivot bushing.

24. The tensioner of claim 20 wherein the base plate interacts with the tensioner arm to limit the range through which the tensioner arm can pivot with respect to the pivot bushing.

25. A tensioner for tensioning a flexible drive, the tensioner comprising:
a base plate;
a shaft having a first end mounted to the base plate and including at least one anti-rotation feature;
a pivot bushing slidably received on the shaft and engaging the at least one anti-rotation feature to prevent rotation of the pivot bushing on the shaft, the pivot bushing having an outer surface which is generally frustoconical;
a damping spring biasing the pivot bushing along the shaft away from the base plate;
a tensioner arm including a first portion and a second portion opposite the first portion, the first portion including a pivot surface having a frustoconical shape complimentary to and engaging the pivot bushing to pivot thereon;
a torsion spring having a first end engaging the base plate and a second end biasing the tensioner arm to bias the tensioner arm in a predetermined direction relative to the base plate;
a pulley coupled to the second portion of the tensioner arm;
a top plate coupled to a second end of the shaft opposite the base plate; and
a thrust washer located between the top plate and the tensioner arm, the thrust washer being configured to inhibit off-axis movement of the tensioner arm while permitting pivoting of the tensioner arm about a longitudinal axis of the shaft;
wherein the pivot bushing includes a unitarily formed, annular and unbroken wall with at least one deformable portion, each deformable portion being formed by a narrowing of the wall, the at least one deformable portion being configured to permit the frustoconical outer surface of the pivot bushing to expand radially outward, contract radially inward or both;
wherein the narrowing of the wall is formed by a pair of slots that are parallel to one another and parallel to a longitudinal axis of the shaft, the narrowing of the wall is formed by a pair of slots;
wherein the wall defines a plurality of grooves that intersect the frustoconical outer surface;
wherein the top plate and the base plate are interchangeable;
wherein one of the top plate and the base plate interacts with the tensioner arm to limit a range through which the tensioner arm can pivot with respect to the pivot bushing;
wherein the shaft includes a hollow central stem, an outer stem surface and a plurality of longitudinally extending apertures disposed between the hollow central stem and the outer stem surface;
wherein the outer stem surface is defined by a plurality of lobes that are coupled to the hollow central stem;
wherein each of the at least one anti-rotation features is disposed between a pair of the lobes; and
wherein each of the at least one anti-rotation features is a longitudinally extending slot.

* * * * *